Figure 1:
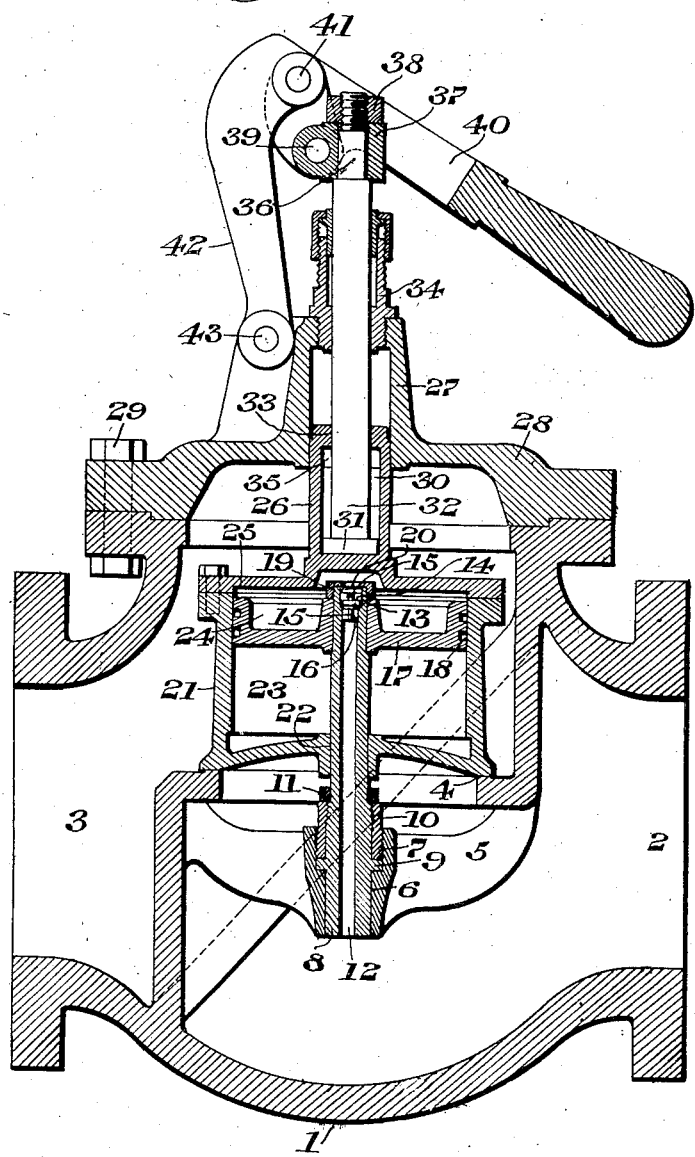

No. 846,059. PATENTED MAR. 5, 1907.
J. V. SCHMID.
AUTOMATIC RELIEF AND BACK PRESSURE VALVE.
APPLICATION FILED SEPT. 17, 1906.

3 SHEETS—SHEET 1.

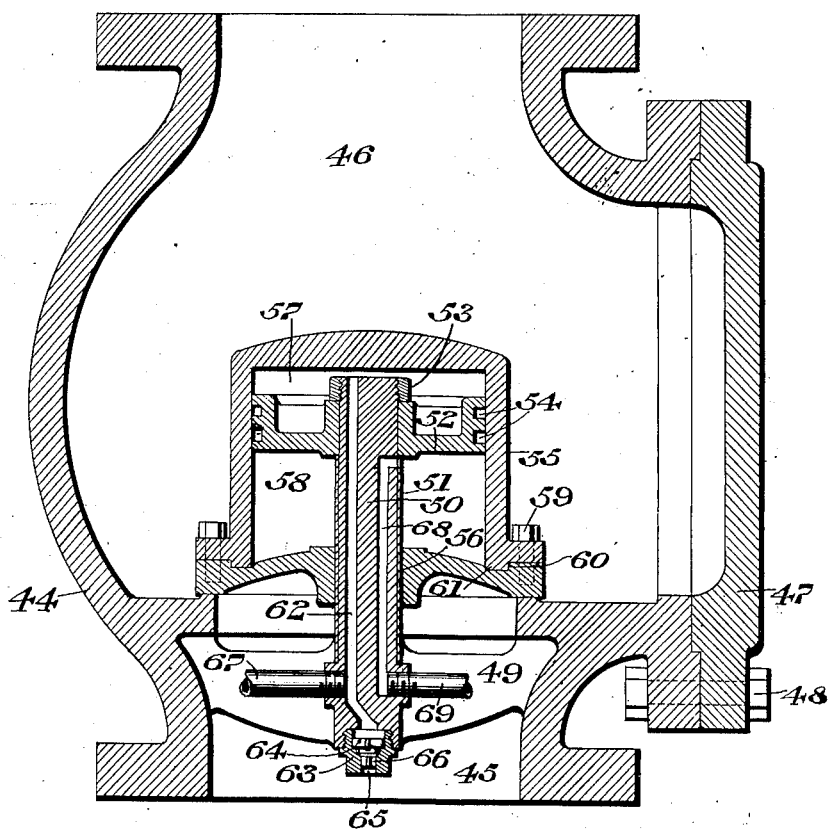

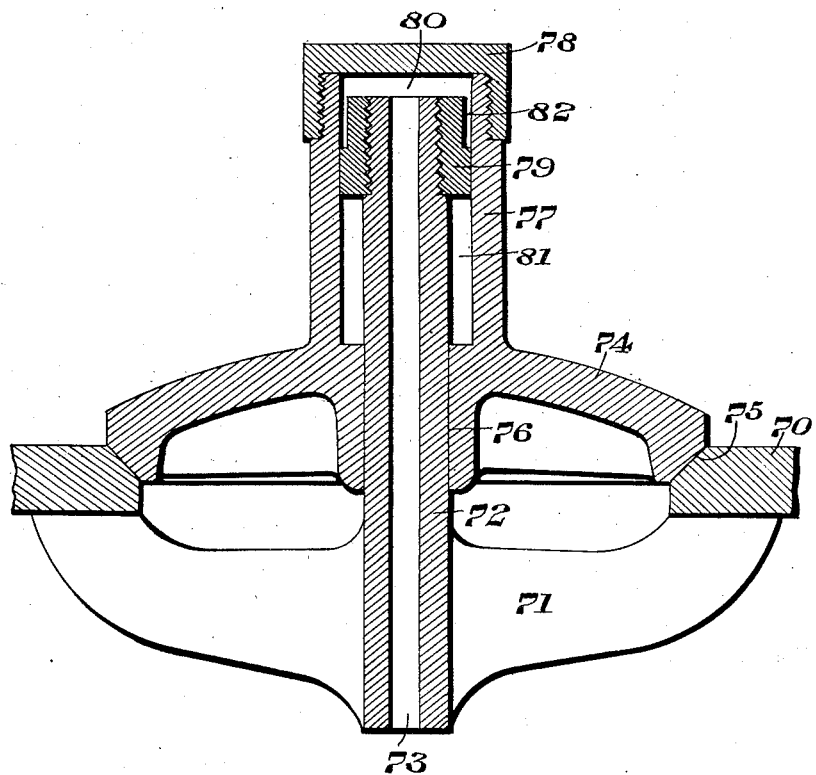

UNITED STATES PATENT OFFICE.

JOHN V. SCHMID, OF PHILADELPHIA, PENNSYLVANIA.

AUTOMATIC RELIEF AND BACK-PRESSURE VALVE.

No. 846,059.     Specification of Letters Patent.     Patented March 5, 1907.

Application filed September 17, 1906. Serial No. 334,991.

*To all whom it may concern:*

Be it known that I, JOHN V. SCHMID, a citizen of the United States, residing in the city and county of Philadelphia, State of Pennsylvania, have invented a new and useful Automatic Relief and Back-Pressure Valve, of which the following is a specification.

My present invention relates to automatic relief and back-pressure valves, and consists of a novel and simplified construction in which parts are dispensed with which have heretofore been deemed essential.

It has heretofore been proposed to employ in a valve of this character a stop mechanism and guide located above the valve, said stop mechanism being carried by the casing and extending downwardly therefrom in the globe and angle forms, thus necessitating the provision in the vertical type of lugs on the body portion for supporting this stop mechanism.

In my present invention I have overcome the necessity of employing a stop device such as has heretofore been used; and to the above ends my invention consists, broadly, of a novel construction in which the relief-valve remains closed as long as a vacuum is maintained in the condenser, but as soon as the vacuum is lost the valve immediately opens and the engine exhausts into the atmosphere and continues to run non-condensing until the vacuum is restored, whereupon the valve automatically closes.

It further consists of a novel construction of a double-acting piston-valve which prevents the valve from opening too suddenly and also prevents the clattering or hammering of the valve when the engine is running non-condensing.

It further consists of a novel construction in which all of the moving parts are so located that there is no possibility of their rusting or corroding due to exposure to the weather, especially in the vertical type.

It further consists of a novel construction of a double-acting valve in which means are provided for positively seating or unseating the valve, as desired.

It further consists of a novel construction and arrangement of parts whereby it is not essential that the check-valve employed to admit additional fluid-pressure to the hollow valve should have an accurate fit, since if there is any leakage around this valve it can only pass to the chambers in the hollow valve, and if there is any leakage around the piston-support through the bottom of the hollow valve this fluid will pass back into the inlet-chamber.

It further consists of other novel features of construction, all as will be hereinafter fully set forth.

Figure 1 represents a sectional view of an automatic relief and back-pressure valve embodying my invention. Fig. 2 represents a sectional elevation of another embodiment thereof. Fig. 3 represents a sectional elevation of another embodiment of my invention, showing only a portion thereof.

Similar numerals of reference indicate corresponding parts in the figures.

Referring to the drawings, referring first to Fig. 1, 1 designates a casing having an inlet-chamber 2 and an outlet-chamber 3.

4 designates a valve-seat which carries a spider 5, the same having an aperture therethrough of differential diameters 6 and 7.

8 designates a piston-support and valve-guide having a flange or shoulder 9, which is adapted to engage the enlarged diameter 7, said piston-support 8 being secured in place by means of a nut or sleeve 10, which abuts against the shoulder 9 and has threaded or other engagement with the piston-support 8.

11 designates a lock-nut for the nut 10.

12 designates a passage extending through the piston-support 8, the upper end of which is enlarged, as seen at 13, in order to receive a check-valve 14 of any suitable or conventional type. This valve in the present instance has ribs or guides 15, extending therefrom, which serve to keep the valve always central and prevent it from leaving its seat, and the valve is also provided with a body portion 16.

17 designates a stationary piston having annular grooves 18 therein. This piston is maintained in proper position with respect to the piston-support 8, in the present instance by means of a cap 19, having threaded or other engagement with the upper end thereof, said cap being provided with an aperture 20, extending therethrough.

21 designates a hollow main valve having an aperture 22 through the bottom thereof, adapting the same to slide on the piston-support 8, the piston 17 having sliding engagement with the walls of the chamber and dividing the same into two chambers 23 and 24, it being understood that the piston 17 is of such dimensions that the fluid may leak therearound from the chamber 23 to the chamber 24, and vice versa, to a desired extent. The valve 21 is provided with a removable top or cover 25, which is secured thereto by any suitable means, said cover 25 having an outwardly-projecting member 26, which is guided in a chamber 27 in the casing-cover 28, which is secured to the casing 1 by any suitable means, such as bolts and nuts 29 or equivalent fastening devices. The member 26 is provided with a chamber 30, in which the enlarged diameter 31 of a rod 32 is mounted, the rod 32 passing through an aperture 33 in the top of said member 26 and also extending through a stuffing-box 34, which has threaded or other engagement with the casing-cover 28. The member 26 is recessed on one side, as seen at 35, in order that the enlarged head 31 of the rod 32 may be readily inserted in the chamber 30.

36 designates a reduced end of the rod or stem 32, having mounted thereon the block 37, which is maintained in position by means of a nut 38, which has threaded engagement with the end of the stem 36. The block 37 is pivoted at 39 to a handle or lever 40, said handle being pivoted at 41 to a link 42, which is fulcrumed at 43 to the casing-cover 28. In this embodiment it is to be noted that a double-acting valve is employed which prevents the valve from opening too suddenly and also prevents any clattering of the valve when the engine is running non-condensing. When the engine is condensing and the vacuum has ceased, the engine will still continue to inject steam into the exhaust-pipe 2. The steam will accumulate in this exhaust-pipe and it will be necessary for the valve to open.

The operation of this embodiment will be readily apparent and is as follows: As the pressure accumulates in the exhaust-pipe 2 and underneath the hollow valve 21 the fluid will find its way through the passage 12 in the piston-support to the small check-valve 14 and raising the same will pass into the chamber 24, formed between the piston 17 and the cap 25, it being understood that the main valve is still in its closed or seated position, since the accumulated pressure is as yet insufficient to raise the main valve 21. The fluid passing into the chamber 24 will act against the valve-top 25 and materially assist the pressure acting against the bottom of the valve to raise the main valve, it being apparent that the check-valve will allow the steam to enter the chamber 24 and act as a secondary power to lift the main valve from its seat. Without this admission of motive fluid a higher pressure underneath the valve would be essential and it would be necessary to increase the area of the under seat of the valve to produce the same result. In the present instance I have shown a handle operatively connected with the rod 32, whereby the main valve may be manually actuated when it is desired to have a free exhaust of the fluid. This handle may be permanently located in open position, if desired, owing to the manner in which it is fulcrumed.

Referring now to Fig. 2, 44 designates a valve-casing having an inlet-chamber 45 and a discharge-chamber 46, said casing having a removable side or cover 47, which is secured thereto by suitable fastening devices 48.

49 designates a spider which has extending upwardly therefrom and integral therewith in the present instance the piston-support and valve-guide 50, on which is placed a sleeve or bearing 51, which terminates at a suitable distance below the top of the support 50 in order to serve as an abutment for a stationary piston 52, mounted on the rod 50. Any improper movement thereon of said piston is prevented by means of a nut 53, having threaded or other suitable engagement with the top of the support 50 and abutting against the piston 52. The piston 52 has annular grooves 54 at the outer periphery thereof.

55 designates a hollow main valve having an apertured bottom 56, through which the piston-support or valve-guide 50 passes, the stationary piston 52 dividing the interior of the hollow valve member 55 into two chambers 57 and 58. The piston 52 has a sliding fit within the valve-chambers 57 and 58. The bottom of the casing 55 is removably secured thereto by cap-screws or equivalent fastening devices 59. The bottom of the casing 55 has an annular groove 60 therein, in which a tongue or lip 61 of the upper casing is adapted to be seated, and thus form a water-tight joint or seal between the parts.

62 designates a passage extending through the piston-rod 50 and communicating with the chamber 57 and the inlet-chamber 45, the lower end of this passage 62 having seated therein a plug or closure 63, in which is mounted a check-valve 64, said plug having an aperture 65 extending therethrough. The check-valve 64 has guiding ribs or flanges 66.

67 designates a conductor leading to the passage 62.

68 designates a passage leading from the chamber 58 and communicating with a suitable conductor 69, which in the present instance has engagement with the support 50. It will be apparent that in this embodiment a double-acting piston-valve is employed with which a check-valve coacts; but in this instance the check-valve is placed at the lower end of the passage. In addition, however, I have shown connections leading to the different chambers in the valve in order that motive fluid, if desired—such as compressed air, steam, or the like—may be passed into either of the valve-chambers at will.

It will be apparent that in this construction all the working parts are fully protected from the weather and all other actions which are liable to normally affect the effective working of the valve.

In the ordinary construction of valves of this character a guide at the top of the valve is employed, which serves as a guide for the valve. When the valve opens, this guide prevents the valve from leaving its seat. It will be seen that in this embodiment I have dispensed with the guide-rods and guide-lugs which are ordinarily employed in valves of this character above the main valve, and the main valve is guided on a central support carried by the spider, so that all of the members of the valve mechanism are entirely protected from climatic or other conditions which tend to materially reduce the efficiency of the valve.

It will be further noted that in this embodiment the parts may be readily removed without disturbing the rest of the system in which the valve is located, since the cover 47 of the casing may be readily removed and the hollow valve disassembled and the piston-head removed from its support, so that if the valve-bearing 51 has become worn it may be readily replaced without affecting the component parts of the system in which the valve is located.

The operation of this embodiment is as follows: When the vacuum in the inlet-chamber 45 is overcome, the steam or other fluid will raise the check-valve 64 and permit said fluid to pass into the chamber 57, so that when the pressure of the fluid increases sufficiently the action of the same in the chamber 57 will assist in raising the valve, as well as the pressure of the fluid beneath the main valve. If it is desired to open or close the valve by external means, any desired fluid under pressure may be admitted to the pipes 67 and 69. If fluid-pressure is permitted to pass through the conductor 67, it will pass into the passage 62 and cause the check-valve 64 to be positively seated, thus preventing the escape of said fluid into the inlet-chamber 45, and this fluid will pass into the chamber 57 and acting between the stationary piston and the upper end of the hollow main valve will cause said main valve to be positively raised from its seat. If it is desired to seat the valve, this may be accomplished by admitting fluid-pressure from the pipe 69 into the passage 68, thence to the chamber 58, and this fluid-pressure acting between the stationary piston and the bottom of the valve will cause the valve to be seated in a very positive manner, as is evident. Although in the present instance I have not shown this valve as being adapted to be manually actuated, it will be apparent that for the manual actuation of this valve it is only necessary to connect therewith a lever suitably pivoted. If desired, the check-valve may be dispensed with, in which case the lower end of the passage 62 would be closed.

In the embodiment shown in Fig. 3, 70 designates a casing which supports the spider 71, the latter having extending therefrom and integral therewith, if desired, a rod or support 72, having a passage 73 therethrough, although this passage may be sometimes omitted and a solid rod or guide employed.

74 designates a valve which is adapted to coact with the valve-seat 75, said valve having a bearing 76, which is mounted on the guide or extension 72. The valve 74 is provided with an upwardly-extending member 77, the upper end of which is closed by a suitable cap or cover 78, having threaded or other engagement therewith. Owing to the employment of a piston or block 79, engaging the support 72, two chambers 80 and 81 are formed within the member 77. In order to increase the size of the chamber 80, I have formed an annular recess 82 in the block 79.

In this embodiment it will be seen that in a similar manner to that already described I have produced a novel construction of double-acting valve in which fluid under pressure will pass through the passage 73 into the chamber 80 and acting against the cover or cap 78 of the valve 74 assist the raising of the valve. When the vacuum in the inlet-chamber is overcome, the valve will resume its seat, as is apparent. Owing to the provision of the chambers 80 and 81, the valve will be suitably cushioned both when closing and opening, and there will be no possibility of the valve hammering or clattering during its operation.

In my present construction I do not employ auxiliary pistons in the larger sizes or in places where it is inconvenient to manually operate the free exhaust and to cause the valve to leave its seat. In my construction the free-exhaust valve is more sensitive to the conditions that exist in the exhaust-pipe than in the devices heretofore employed. It is not essential that the small check-valve employed have a tight fit, and if there is more or less leakage therearound it does not materially affect the proper working of the parts. In many cases the vertical free-exhaust valve is open to the weather, and if a spindle is employed above the valve, serving as a guide for the same, then the spindle is liable to be rusted or corroded in such a manner that the proper working of the valve thereon will be materially affected. From my present construction, as shown in Fig. 2, it will be apparent that all the working parts are inclosed, so that the support or bearing on which the main valve moves is protected from climatic conditions.

In all the embodiments of my invention suitable levers or other means may be employed whereby the valve may be manually actuated and springs may be employed, if desired, in order to have the valve act as a back-pressure and free-exhaust valve combined, which it is sometimes desired to do in cases when the engine is running non-condensing, as in winter-time, the exhaust-steam being employed to heat the building. In this case the valve acts as a back-pressure valve to force steam through the coils. When the engine is condensing, as in warmer weather, the valve serves the purpose of a free-exhaust valve.

It will be apparent that the valve may be readily repaired or removed when desired, since the casing-cover and the valve mechanism may be readily disassembled without disturbing the other parts of the system.

It will also be apparent that in all the embodiments of my invention there is no possibility of any hammering or clattering of the valve, owing to the cushioning chambers formed therein and the stationary piston employed. If desired, the bottom of the main valve may be perforated or formed of ribs, in which case the ribs or perforated valve-bottom will abut against the piston and prevent the main valve from leaving its seat, it being noted that in every instance the parts may be so perforated that the piston will engage the bottom of the main valve to serve as a stop to limit the upward movement of said valve, if desired.

In some instances, in which it is desired to employ only cushioning-chambers within the main valve, the passage leading from the inlet-chamber to the interior of the main valve may be dispensed with, and it will be apparent that in such a construction the piston carried by its support will act as a stop to limit the upward movement of said valve.

It will be apparent from the foregoing that I have in the present instance produced a novel and useful construction of valve which embodies the features of advantage enumerated as desirable, and although in the present instance I have shown and described the preferred embodiments thereof it will be apparent that they are susceptible of modification in various particulars without departing from the spirit and scope of the invention or sacrificing any of its advantages.

It will be further apparent that while in the present instance I have shown the piston-support as terminating within the hollow main valve and carried by a spider this piston-support and valve-guide may be otherwise supported and still be within the scope of my invention, it being only essential that this support be carried from below the valve and terminate within the hollow main valve.

Having thus described my invention, what I claim as new, and desire to secure by Letters Patent, is—

1. In a valve, a valve-casing having an inlet and an outlet chamber, a valve-seat in said casing, a piston-support, a piston carried thereby, and a hollow valve surrounding said piston and guided on said support, said piston dividing said valve into a plurality of closed chambers.

2. In a valve, a valve-casing having an inlet and an outlet chamber, a valve-seat in said casing, a piston-support, a piston carried thereby, and a hollow valve surrounding said piston and guided on said support, said piston dividing said valve into a plurality of closed chambers and the upper end of said support terminating within said valve.

3. In a valve, a valve-casing having an inlet and an outlet chamber, a valve-seat in said casing, a piston-support, a piston carried thereby, a hollow valve surrounding said piston and guided on said support, said piston dividing said valve into a plurality of closed chambers and having a passage leading from the inlet-chamber to one of said valve-chamber.

4. In a valve, a valve-casing having an inlet and an outlet chamber, a valve-seat having a spider, a combined stop-piston and guide support carried by said spider, a piston fixed on said support, and a combined hollow valve and double dash-pot surrounding said piston and guided by said support, said support having a passage extending from the inlet-chamber into said hollow valve.

5. In a valve, a casing having an inlet and an outlet chamber, a valve-seat having a spider in said casing, a piston-support carried by said spider, a piston fixed on said support, a hollow main valve surrounding said piston and mounted on said support, said piston dividing said main valve into two closed chambers, said support having a passage leading from the inlet-chamber to one of said valve-chambers, and a check-valve in said passage.

6. In a valve, a casing having an inlet and an outlet chamber, a valve-seat having a spider carried thereby in said casing, a piston-support carried by said spider, a piston secured at the upper end of said support, a hollow main valve surrounding said piston and engaging said support, said piston dividing said main valve into two closed chambers, said support having a passage therethrough communicating with the inlet-chamber and one of said valve-chambers, a check-valve in said passage, and means for manually actuating said main valve.

7. In a valve, a casing having an inlet and an outlet chamber, a valve-seat having a spider in said casing, a support carried by said spider, a piston removably secured to said support, a hollow main valve engaging said support and in which said piston is mounted, said casing having a removable side having a chamber therein, said main valve having an extension engaging said chamber, said piston dividing said main valve into two closed chambers, said support having a passage leading from the inlet-chamber to one of said valve-chambers, and means engaging said piston for manually actuating said valve.

8. In a valve, a casing having an inlet and an outlet chamber, a valve-seat having a spider in said casing, a support carried by said spider, a piston removably secured to said support, a hollow main valve engaging said support and in which said piston is mounted, said casing having a removable side having a chamber therein, said main valve having an extension engaging said chamber, said piston dividing said main valve into two closed chambers, said support having a passage leading from the inlet-chamber to one of said valve-chambers, and means for engaging said extension for manually actuating said valve, said means being adapted to permit said valve to be automatically actuated.

9. In a valve, a casing having an inlet and an outlet chamber, a valve-seat having a spider within said casing, a support carried by said spider, a piston carried by said support, a hollow valve surrounding said piston and engaging said support, said piston dividing said valve into two closed chambers, said support having a passage therethrough leading from the inlet-chamber to the upper of said valve-chambers, and a check-valve in said passage at the upper end thereof.

10. In a valve, a casing having an inlet and an outlet chamber, a valve-seat having a spider in said casing, a support carried by said spider, a sleeve-lining removably mounted on said support, a piston fixed on said support, a hollow main valve surrounding said piston and engaging said lining, said piston dividing said valve into two closed chambers, said support having a passage therethrough leading from the inlet-chamber to the upper of said valve-chambers, and a check-valve in said passage.

11. In a valve, a casing having an inlet and an outlet chamber, a valve-seat having a spider in said casing, a support carried by said spider, a piston having annular grooves therein engaging said support, a hollow main valve in which said piston is mounted and engaging said support, said piston dividing said main valve into two closed chambers, said support having a passage therethrough leading from the inlet-chamber to one of said valve-chambers, means for admitting fluid-pressure to said passage, said support having a passage opening into the other of said chambers, and means for admitting motive fluid thereto.

12. In a valve, a casing having an inlet and an outlet chamber, a valve-seat having a spider in said casing, a support carried by said spider, a piston removably carried by said support, a hollow main valve surrounding said piston and engaging said support and divided by said piston into two closed valve-chambers, said support having a passage leading from the inlet-chamber to the upper of said valve-chambers, a check-valve in said passage, and means intermediate said check-valve and said main valve for admitting fluid-pressure to the latter.

13. In a valve, a casing having an inlet and an outlet chamber, a valve-seat having a spider in said casing, a support carried by said spider, a piston removably secured to said support, a hollow main valve engaging said support and surrounding said piston and divided thereby into two valve-chambers, said support having a passage leading from the inlet-chamber to one of said valve-chambers, a check-valve in said passage, means for admitting fluid-pressure to said passage, said support having a second passage therethrough leading to the other of said valve-chambers, and means for controlling the passage of fluid-pressure thereto.

14. In a valve, a casing having an inlet and an outlet chamber, a valve-seat having a spider in said casing, a support carried by said spider, a piston removably carried by said support, a hollow valve surrounding said piston and engaging said support, said piston dividing said valve into a plurality of chambers, said support having a passage therethrough leading from said inlet-chamber to the upper of said valve-chambers, a check-valve in said passage, a pipe leading from a fluid-supply to said passage, said support having a passage opening into the lower of said chambers, and a pipe leading from a fluid-supply communicating with said passage.

15. In a valve, a valve-casing having an inlet and an outlet chamber, a valve-seat having a spider, a piston-support carried by said spider, a piston fixed on said support, and a combined hollow valve a double dash-pot surrounding said piston and guided by said support, said piston serving as a stop for said valve in both directions.

16. In a valve, a valve-casing having an inlet and an outlet chamber, a valve-seat having a spider, a piston-support carried by said spider, a piston fixed on said support, and a hollow valve surrounding said piston and guided by said support, said support having a passage extending from the inlet-chamber into said hollow valve, said piston serving as a stop for said valve, in both directions.

17. In an automatic valve, a casing having an inlet and outlet chamber, a combined stop, guide, and piston - support, a piston thereon, and a combined hollow valve-disk and double dash-pot guided on said support, the lower end of said hollow valve-disk and double dash-pot engaging said piston when said valve-disk and double dash-pot reaches its maximum stroke.

18. In an automatic valve, a casing having an inlet and outlet chamber and a valve-seat, a combined stop, guide, and piston-support, a piston carried thereby, and a combined hollow valve-disk and double dash-pot surrounding said piston and guided on said support, said piston dividing said combined hollow valve-disk and double dash-pot into a plurality of chambers, the size of which vary when the valve is automatically actuated.

19. In an automatic valve, a casing having an inlet and outlet chamber, a valve-seat having a spider supported below said seat, a combined stop, guide, and piston-support carried by said spider, a piston removably secured to said support, a combined hollow valve-disk and double dash-pot engaging said combined stop, guide and piston-support and in which said piston is mounted, said casing having a removable side having a chamber therein, said combined valve-disk and double dash-pot having a piston engaging said chamber, said piston dividing said dash-pot into two chambers, said support having a passage leading from the inlet-chamber to the upper chamber of said dash-pot, and means for manually actuating said valve-disk.

20. In an automatic valve, a casing having an inlet and outlet chamber, a valve-seat having a spider, a combined stop, guide, and piston-support carried by said spider, a piston removably secured to said support, a combined hollow valve-disk and double dash-pot engaging said support and in which said piston is mounted, said casing having a removable side having a chamber therein, said combined valve and double dash-pot having a piston engaging said chamber, said piston dividing said dash-pot into two chambers, said support having a passage leading from the inlet-chamber to the upper chamber of the dash-pot, and means engaging said piston for manually actuating said valve and dash-pot, said means being adapted to permit said valve to be automatically actuated.

21. In an automatic valve, a casing having an inlet and outlet chamber, a valve-seat having a spider, a combined stop, guide, and piston-support carried by said spider, a piston carried by said support, a combined hollow valve-disk and double dash-pot surrounding said piston and engaging said support, said piston dividing said dash-pot into two chambers, said support having a passage therethrough leading from the inlet-chamber to the upper chamber of said dash-pot, and an automatic check-valve in said passage at the upper end thereof.

22. In an automatic valve, a casing having an inlet and outlet chamber, a valve-seat having a spider, a combined stop, guide, and piston-support carried by said spider, a sleeve removably mounted on said support, a piston fixed on said support, a combined hollow valve-disk and double dash-pot surrounding said piston and engaging said sleeve, said piston dividing said dash-pot into two chambers, said spider being supported from below said valve-seat, said support having a passage therethrough leading from the inlet-chamber to the upper chamber of said double dash-pot, and an automatic check-valve in said passage.

23. In an automatic and fluid-pressure-actuated valve, a casing having an inlet and outlet chamber, a valve-seat having a spider supported from below said seat, a combined stop, guide, and piston-support carried by said spider, said piston having annular grooves therein, a combined hollow valve-disk and double dash-pot engaging said support and surrounding said piston, said piston dividing said dash-pot into two chambers, said support having a passage therethrough leading from the inlet-chamber to the upper chamber of said dash-pot, means for admitting fluid-pressure to said passage, said support having a passage opening into the lower chamber of said dash-pot, and means for admitting fluid-pressure thereto.

24. In an automatic and fluid-pressure-operated valve, a casing having an inlet and outlet chamber, a valve-seat having a spider supported from below the valve-seat, a combined stop, guide, and piston-support carried by said spider, a piston removably carried by said support, a combined hollow valve-disk and double dash-pot surrounding said piston and engaging said support, said piston dividing said dash-pot into two chambers, said support having a passage leading from the inlet-chamber to the upper chamber of said dash-pot, an automatic check-valve in said passage, and means intermediate said check-valve and the upper chamber of said dash-pot for admitting fluid-pressure to said passage.

25. In an automatic and fluid-pressure-operated valve, a casing having an inlet and outlet chamber, a valve-seat having a spider supported from below said seat, a combined stop, guide, and piston-support carried by said spider, a piston removably secured to said support, a combined hollow valve-disk and double dash-pot engaging said support and surrounding said piston, said piston dividing said dash-pot into two chambers, said support having a passage leading from the inlet-chamber to the upper chamber of the dash-pot, an automatic check-valve in said passage, means for admitting fluid-pressure to said passage, said support having a second passage therethrough leading to the lower chamber of said dash-pot, and means for controlling the passage of fluid-pressure thereto.

26. In an automatic and fluid-pressureoperated valve, a casing having an inlet and outlet chamber, a valve-seat having a spider supported below said seat, a combined stop, guide, and piston-support carried by said spider, a piston removably carried by said support, a combined hollow valve-disk and double dash-pot surrounding said piston and engaging said support, said piston dividing said dash-pot into a plurality of chambers, said support having a passage therethrough leading from said inlet-chamber to the upper chamber of said dash-pot, an automatic check-valve in said passage, a conduit leading from a fluid-supply to said passage, said support having a passage leading from said inlet-chamber into the lower chamber of said dash-pot, and a conduit leading from the fluid-supply communicating with said second passage.

JOHN V. SCHMID.

Witnesses:
JOHN A. WIEDERSHEIM,
H. STOCKWELL FAIRBANKS.